UNITED STATES PATENT OFFICE.

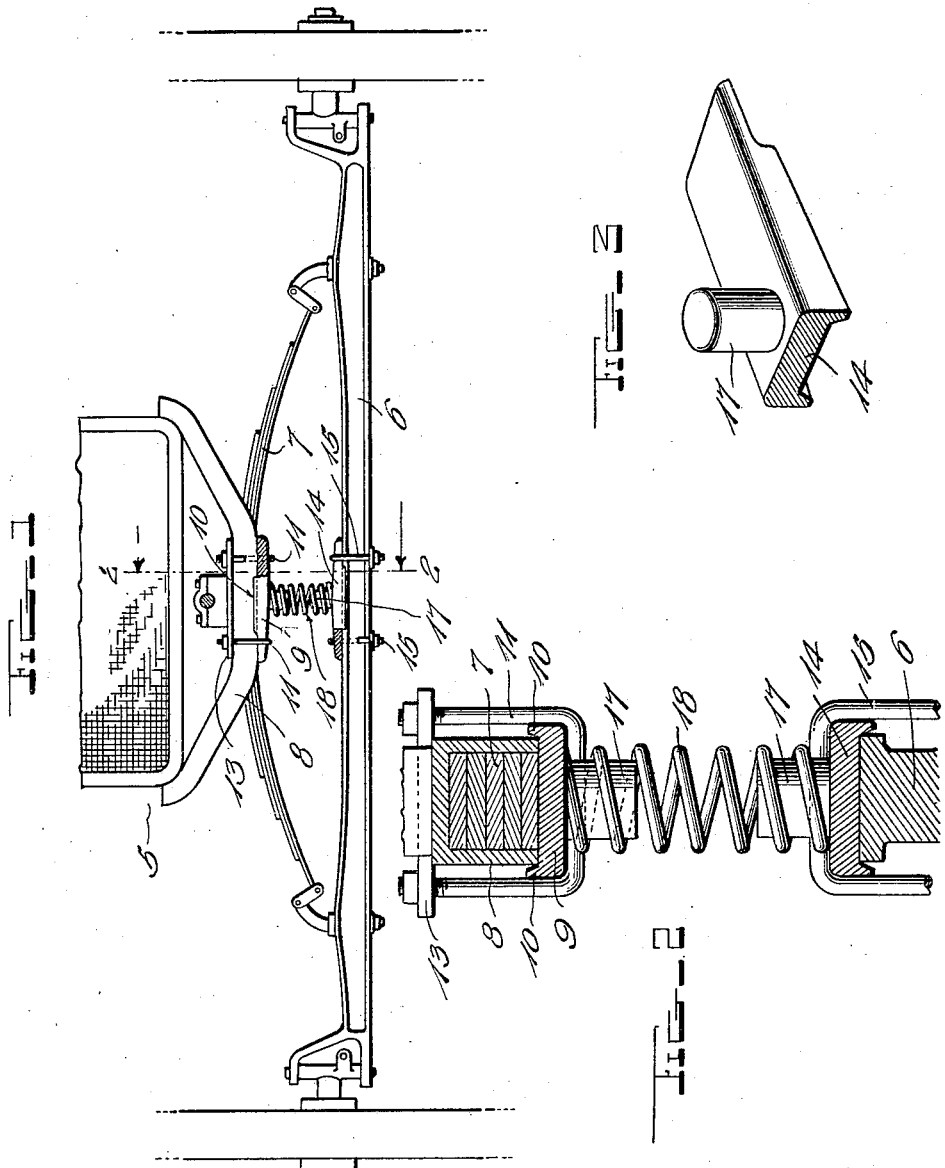

HENRY FLOYD SANDERS AND EDWARD C. DISBENNETT, OF CARUTHERSVILLE, MISSOURI.

SHOCK-ABSORBER.

1,297,253.　　　Specification of Letters Patent.　　Patented Mar. 11, 1919.

Application filed March 29, 1918. Serial No. 225,442.

*To all whom it may concern:*

Be it known that we, HENRY F. SANDERS and EDWARD C. DISBENNETT, citizens of the United States, residents of Caruthersville, in the county of Pemiscot and State of Missouri, have invented new and useful Improvements in Shock-Absorbers, of which the following is a specification.

This invention relates to shock absorbers and has particular reference to that class of shock absorbers adapted to be used in connection with automobile spring suspensions.

An important object of the invention is to provide in a shock absorber a means whereby the same may be readily installed in a desired position with respect to the spring with which it is designed to be used.

A further object of the invention is to provide in a device of the above mentioned character a means whereby certain elements employed therein may be maintained in a desired position with respect to each other.

A further object of the invention is to provide a device of the above mentioned character which is strong, durable, reliable in operation and cheap to manufacture.

Other objects and advantages of the invention will become apparent during the course of the following description taken in connection with the accompanying drawings.

In the accompanying drawings, forming a part of this specification and in which like numerals are employed to designate like parts throughout the same, Figure 1 is a front end elevation of an automobile showing the device embodying our invention attached thereto, Fig. 2 is a transverse sectional view of Fig. 1 taken on line 2—2, and Fig. 3 is a sectional perspective view of a plate.

In the drawings, wherein for the purpose of illustration is shown the preferred form of our invention, the numeral 5 indicates the forward end of a Ford automobile having a front axle 6 to which is secured a leaf-spring 7 carrying an angle-iron 8 which serves as a supporting member for the front end of the automobile. To the lower face of the spring 7 there is secured a plate 9 having upwardly turned flanges 10 between which the side flanges of the angle-iron 8 is arranged as clearly shown in Fig. 2. As a means for securing this plate 9 in position there is provided a pair of yokes 11 having their ends screw-threaded as shown and passed through a bed-plate 13 imposed upon the angle-iron 8 as clearly shown in Fig. 2. To the axle 6 substantially intermediate its ends there is secured a plate 14 identical with that indicated by the numeral 9 and hereinbefore described. This plate is held in position upon the axle 6 by means of yokes 15 having their ends passed through plates disposed transversely with respect to the axle 6. Each of the plates 9 and 14 substantially intermediate the ends thereof is provided with a post or knob 17. These knobs serve as a means for retaining a coil spring 18 in position with respect to the plates 9 and 14, which spring is interposed between the axle 6 and the leaf-spring 7.

In use, the operation of the device is as follows: should a wheel of the automobile come into contact with an obstruction in the course of travel the axle 6 is forced upwardly against the influence of the leaf-spring 7 and the coil-spring 18 whereupon any excessive shock will be absorbed which would otherwise be imparted to the automobile as a whole. While we have shown our device as applied to a Ford automobile and disposed between the axle and spring, thereof we wish it understood that the same may be equally as well employed with any type of automobile employing any desired form of spring suspension.

We wish it further understood that while we have shown the preferred form of our invention, that various changes in the shape, size, and arrangement of parts may be resorted to without departing from the spirit of the invention or the scope of the subjoined claim.

Having thus described our invention, what we claim as new and desire to secure and protect by Letters Patent of the United States, is:

In an automobile spring suspension, an axle, an angle-iron supporting member, a leaf spring having an intermediate portion thereof confined between the flanges of said angle-iron supporting member, a plate secured to said angle-iron supporting member, said angle-iron supporting member and plate completely inclosing that portion of the spring confined between the flanges of said angle-iron supporting member, a pair of flanges carried by said plate, said flanges being spaced from each other and having engagement with opposite sides of said angle-iron supporting member, a post carried by said plate, a second plate secured to said axle, the second named plate being provided with flanges having engagement with opposite sides of said axle, a post carried by the second named plate, the second named post having its axis coincident with the axis of the first named post, and a spring having engagement with said plates and retained in position with respect to the same by said posts.

HENRY FLOYD SANDERS.
EDWARD C. DISBENNETT.

Copies of this patent may be obtained for five cents each, by addressing the "Commissioner of Patents, Washington, D. C."